Figure 1:
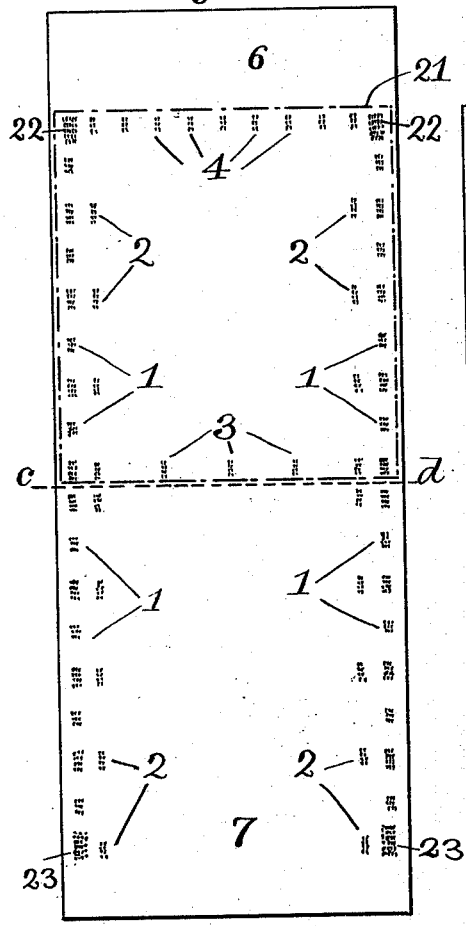

(No Model.) 3 Sheets—Sheet 1.

W. A. LORENZ & W. H. HONISS.
PAPER BAG.

No. 559,138. Patented Apr. 28, 1896.

Witnesses:
Ed. E. Claussen
H. Mallner

Inventors:
William A. Lorenz
W. H. Honiss (No Model.) 3 Sheets—Sheet 2.
W. A. LORENZ & W. H. HONISS.
PAPER BAG.

No. 559,138. Patented Apr. 28, 1896.

Witnesses:
Ed. O. Claussen
H. Mallner

Inventors:
William A. Lorenz
W. H. Honiss (No Model.) 3 Sheets—Sheet 3.
W. A. LORENZ & W. H. HONISS.
PAPER BAG.
No. 559,138. Patented Apr. 28, 1896.
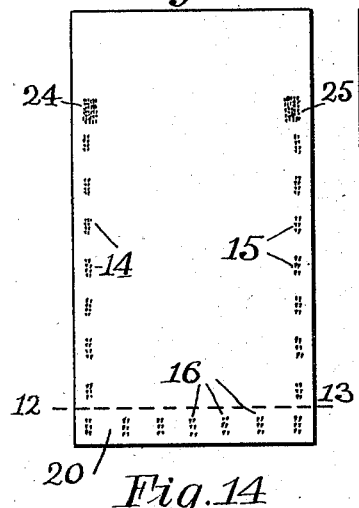
Fig. 13
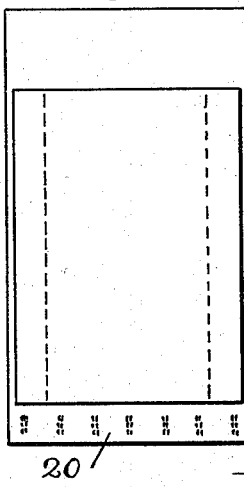
Fig. 17
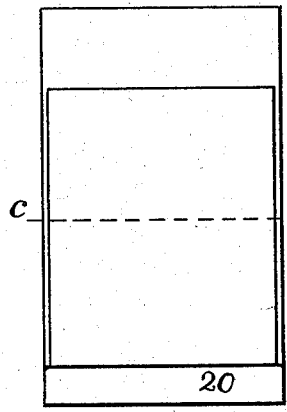
Fig. 18
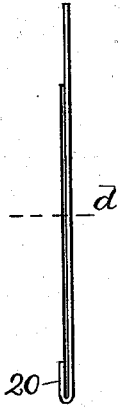
Fig. 19
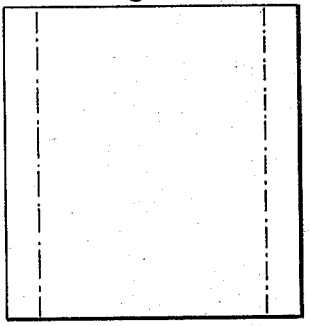
Fig. 14
Fig. 15
Fig. 16
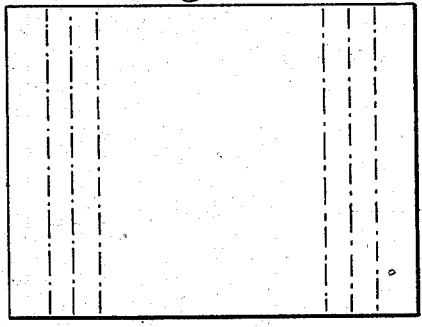
Fig. 20
Fig. 21
Fig. 22
Fig. 23
Fig. 24
Witnesses:
Ed. E. Claussen
H. Mallner
Inventors:
William A. Lorenz
W. H. Honiss

UNITED STATES PATENT OFFICE.

WILLIAM A. LORENZ AND WILLIAM H. HONISS, OF HARTFORD, CONNECTICUT.

PAPER BAG.

SPECIFICATION forming part of Letters Patent No. 559,138, dated April 28, 1896.

Application filed April 20, 1894. Serial No. 508,250. (No model.)

*To all whom it may concern:*

Be it known that we, WILLIAM A. LORENZ and WILLIAM H. HONISS, citizens of the United States, residing at Hartford, in the county of Hartford and State of Connecticut, have invented certain new and useful Improvements in Paper Bags, of which the following is a full, clear, and exact specification.

This invention relates to improvements in the form and in the manufacture of paper bags. It has special reference to the production of bags composed of two or more pieces of paper, the outer covers or walls being of sufficiently stiff material to remain flat when in use, and those walls being connected together by flexible sides, which are sufficiently pliable to allow of the ready collapsing and expanding of the bags. It is applicable also to the production of bags like those shown and described in the United States Patent to William A. Lorenz, No. 471,257, of March 22, 1892. In the commercial manufacture of these forms of bags the joining together of two pieces of paper of differing texture or weight, or both, is attended with certain practical difficulties which it is the purpose of this invention to obviate. Among those difficulties is that of forming the plicated folds of the inner pieces so accurately as to make those pieces all of the exact width of their respective outer covers, and in joining each piece to its cover in perfect register even when so made of exactly equal width, as in the Lorenz patent above referred to. When the edges of the plicated inner piece project beyond the edges of its cover, either by reason of the greater width of the former or because of inaccurate register, the appearance of the bag and of a package of such bags is greatly detracted from. Furthermore, the projecting folded edges of the inner piece are liable to become worn through in the handling of the package. We obviate this difficulty in the present invention by making the inner or plicated blank substantially narrower than the blank to which it is to be joined, so that the ordinary variations above mentioned will not be noticeable. Another difficulty is in the pasting together of paper of differing thickness, so as to have them lie flat and smooth when dry, and is due to the unequal expansion of the two papers when wet by the paste. Especially is this the case where the "grain" of one paper is laid across that of the other, which it is sometimes desirable to do for convenience in manufacturing by automatic machinery.

We have found that the cockling and unevenness of pasted sheets after drying is largely due to the usual mode of applying the paste in lines of considerable length. That portion of each sheet which is wet by the paste lines expands in accordance with its own coefficient of expansion, which varies greatly with different textures and varies in direction upon the same sheet. The paste becomes "set" while the wet portions of the sheets are in their unequally-expanded condition, and because of the tendency of the papers to resume their original form in drying unequal strains are set up all along the paste lines.

In the present invention we secure a smooth and flat product, free from the cockling above referred to, by applying our paste in spots located where they are most needed for strength. We thus localize the expansion due to the wetting, limiting it to the area of the spots.

Our improvements in the form and in the manufacture of bags whereby we have obviated the above-mentioned difficulties will now be more particularly described.

Figure 2:
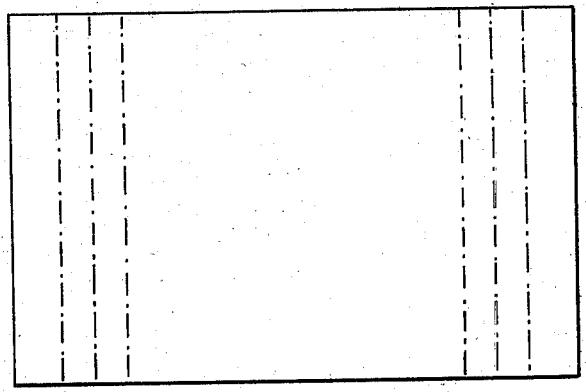
Figure 3:
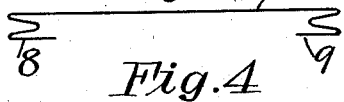
Figure 4:
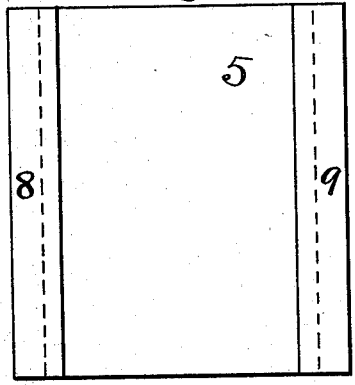
Figure 12:
Figure 5:
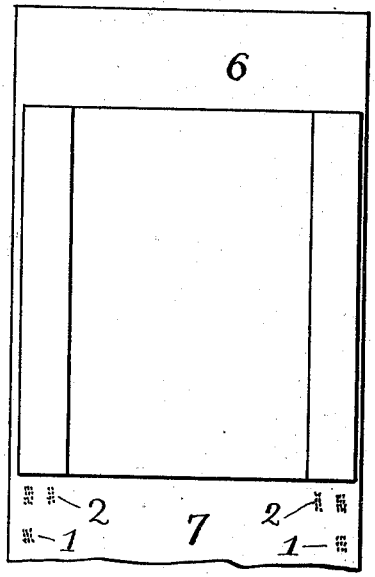
Figure 6:
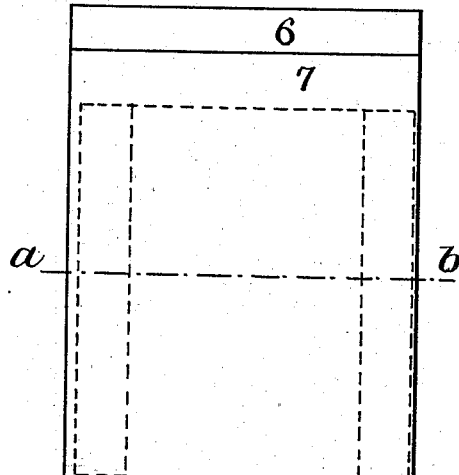
Figure 7:
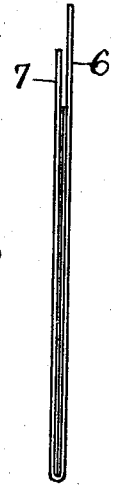
Figure 11:
Figure 8:
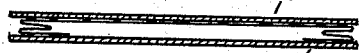
Figure 9:
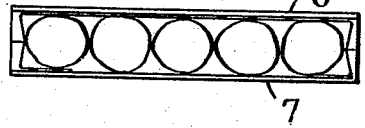
Figure 10:
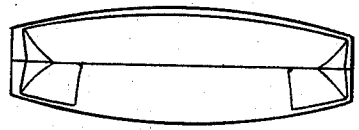

Figure 1 of the drawings represents a rectangular piece of paper adapted to form the outer walls or cover of our improved bag by folding it upon the transverse line *c d*. Upon this piece are also represented the required paste spots 1, 2, 3, and 4. Fig. 2 is a view of a rectangular piece of paper suitable for folding upon the dot-and-dash lines to form the inner blank or connecting member of the bag. Fig. 3 is an edge view, and Fig. 4 is a side view, of the sheet of Fig. 2 folded on the dot-and-dash lines thereof. Fig. 5 is a view of the blank of Figs. 3 and 4 pressed down on the blank of Fig. 1, with its surface 5 adhering to the paste spots on the upper half 6 of the blank. The lower half 7 is broken away in this figure. Figs. 6 and 7 are a side and an edge view, respectively, of the two blanks shown in Fig. 5, with the lower half 7 of the outer blank folded and pasted down on the inner blank, the pasted spots on the half 7 adhering to the parts 8 9 of the blank of Figs. 3 and 4. Fig. 8 is a cross-section on the line $a\,b$ of Fig. 6. Fig. 9 is a plan view of our completed bag expanded and filled; and Fig. 10 is a similar view of a bag made of thin paper, illustrating by comparison with Fig. 9 its greater amount of distention, whereby the cigars are allowed to become crossed and wedged together. Fig. 11 is a longitudinal section through the bag of Fig. 9. Fig. 12 is a plan view of a bag with three compartments similar to those shown in the Lorenz patent above referred to, excepting that the inner blank is herein made substantially narrower than the outer blank. Fig. 13 is a view of another rectangular piece of paper suitable to be folded near its lower end at the cross-line 12 13 into the outer long and short walls of a bag and provided with paste spots 14, 15, and 16 arranged in rows. Fig. 14 is a view of a rectangular piece of paper. Fig. 15 is an edge view, and Fig. 16 a side view, of that piece of paper folded upon the dotted lines of Fig. 14. Fig. 17 represents the blank of Figs. 15 and 16 pressed down upon the blank of Fig. 13, with its surfaces 18 adhering to the paste spots 14 and 15. Figs. 18 and 19 are a side and an edge view, respectively, of the joined blanks of Fig. 17, with the lower part 20 of the outer blank folded over and adhering by its paste spots 16 to the inner blank, thus completing the bag. Fig. 20 is a view of another rectangular piece of paper adapted to be folded in the dot-and-dash lines to form the folded blank shown in Figs. 21 and 22. This folded blank is adapted to be used in place of the blank of Figs. 15 and 16 when it is desired to make a bag with bellows sides. Fig. 23 is a section of the bag of Figs. 18 and 19 on the cross-line $c\,d$. Fig. 24 is a section of the bag of Figs. 18 and 19, with the blank of Figs. 21 and 22 used instead of the blank of Figs. 15 and 16.

The dot-and-dash outline 21 upon Fig. 1 is that of the blank of Fig. 4 if placed exactly central thereon. In Figs. 5, 6, and 8 the inner blank is represented as being placed to the right of the center of its outer blank 6 as an illustration of the fact that such a displacement incidental to its manufacture would not affect the utility or the external appearance of the completed bag or expose the folded edges of the inner blank to injury in the handling of a package of such bags, as would be the case if a similar displacement were to occur in the joining of two blanks of equal width.

In the application of the paste it is desirable to be able to regulate the amount of paste to suit the varying requirement of each portion of the blank. For example, the four corners 22 23 of Fig. 1 and the corners 24 25 of Fig. 13 require to be more strongly pasted than any other portion of the bag. It is also desirable to apply more paste at the edges, as represented in Fig. 1 by the greater number of spots in the outer rows 1 compared with the rows 2. Herein resides a great advantage of our method of applying the paste in spots, inasmuch as they may be larger or more numerous where required. In applying the paste in lines it is difficult to thus regulate or vary the amount, for the reason that the paste tends to run along the lines a considerable distance, and it is as liable to flow away from the points where it is needed as it is to flow toward those points.

A desirable and necessary feature of bags intended to hold cigars is that of keeping the outer covers flat, so that they cannot take the form shown in Fig. 10 and thus allow the cigars to become crossed and broken. In the Lorenz patent, above referred to, the outer walls are stayed by transverse partitions, which also form separate compartments for the cigars. In our present invention this object is secured by making the outer blank or cover of material substantially thicker than the inner piece, which must be of a material sufficiently pliable to fold easily and soft enough to avoid injuring the fragile wrappers of the cigars to be placed therein. Either of these forms of paper bags may be made by cutting, pasting, and folding paper in the ways indicated in the drawings and explained in the foregoing description, and they may also be made by suitable machinery which we have invented.

We claim as our invention—

A bellows-sided paper bag, consisting of a stiff outer cover and of a flexible plicated inner piece attached thereto in isolated spots for the purpose specified; the inner piece being substantially narrower than the stiff cover portion; and the plicated portions of the inner piece forming the bellows sides or edges of the bag, substantially as described.

WILLIAM A. LORENZ.
W. H. HONISS.

Witnesses:
ALBERT H. WALKER,
MABEL B. WARREN.